Dec. 20, 1938.  E. E. HEWITT  2,140,641
ACCELERATION CONTROLLER
Filed March 28, 1934
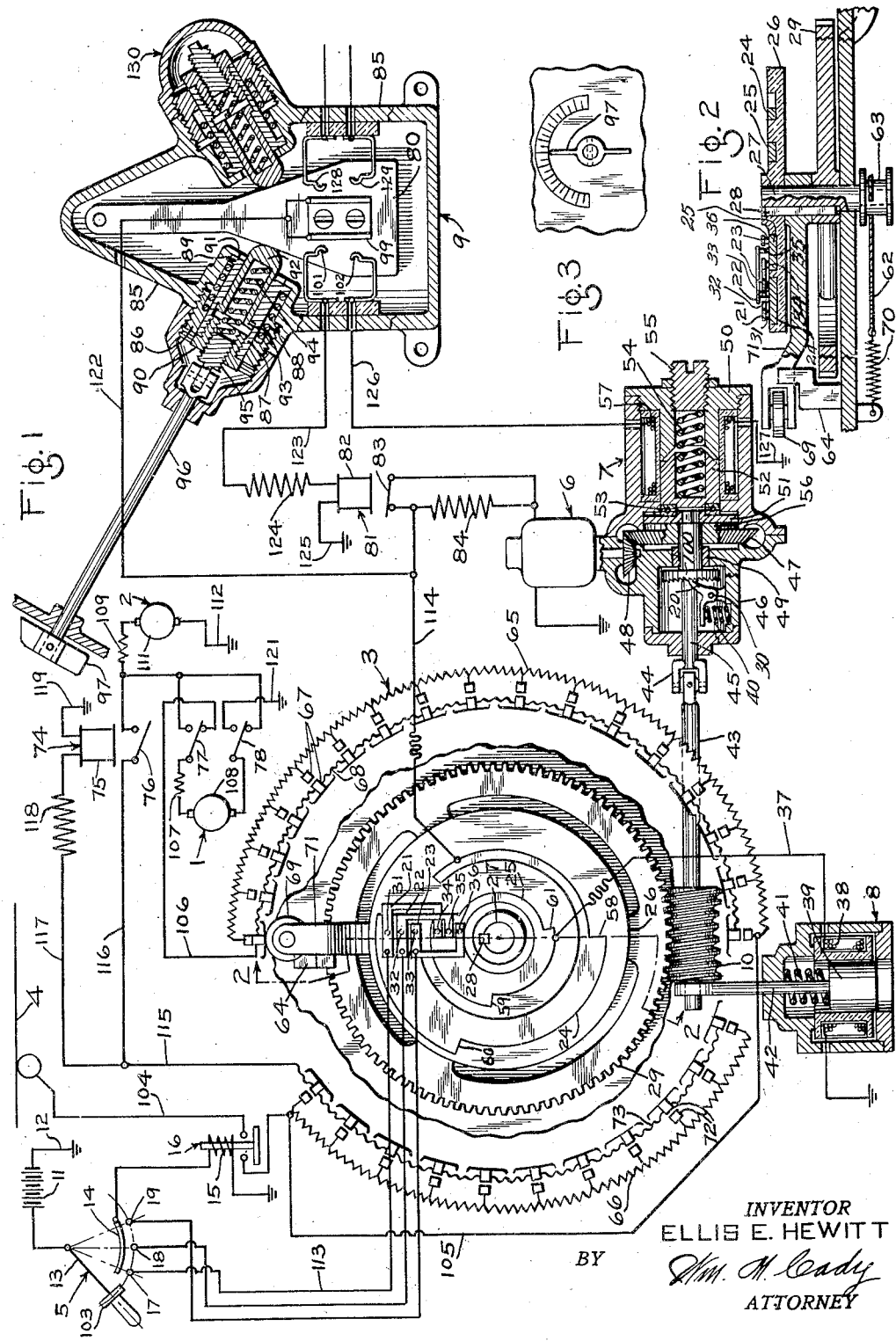
INVENTOR
ELLIS E. HEWITT
BY
Wm. M. Cady
ATTORNEY Patented Dec. 20, 1938

2,140,641

UNITED STATES PATENT OFFICE 2,140,641

ACCELERATION CONTROLLER

Ellis E. Hewitt, Edgewood, Pa., assignor to The Westinghouse Air Brake Company, Wilmerding, Pa., a corporation of Pennsylvania Application March 28, 1934, Serial No. 717,758

12 Claims. (Cl. 172—179)

My invention relates to accelerating control systems for railway vehicles, or vehicles driven by electric motors, and particularly to means for limiting the maximum permissible acceleration independently of the vehicle loading.

Modern systems of control for electrically driven motor cars and trains provide a master controller by means of which the motorman can apply varying amounts of power to the motors by simply moving the handle of the master controller to selected positions. The master controller does not directly handle the current flowing to the electric motors, but is so arranged as to cause the operation of a main motor controller in the motor circuit which operates to automatically increase the supply of current to the motors at a fixed rate of speed until it reaches the desired position, corresponding to that of the master controller. The fixed rate at which the main motor controller automatically cuts out the motor resistance is determined as the fixed rate at which the main controller can be manipulated without exceeding a main motor current value that will cause the wheels to slip on the track. The main motor torque will be substantially proportional to the current flowing through the motor, independently of the voltage applied thereto, and consequently control systems of the general type described above are usually provided with a current limit relay device which is arranged to interrupt or arrest the operation of the main controller whenever the current to the motor exceeds a certain predetermined value. The current limiting device is also arranged in such manner that, when the main motor current falls below the safe value, the automatic controller will proceed to advance, increasing the motor current to a value corresponding to that determined by the position of the master controller.

When a current limiting relay device is employed in connection with the modern control system described above, it is necessary to so adjust the current limit relay that it will operate on a current value which will be slightly less than the current required to spin the car wheels on the rails when the car is empty. If the car is loaded, a much higher current setting could be employed without danger of spinning the wheels and, consequently, it is desirable that provision should be made for manually adjusting such a current limiting device.

When a current limit relay is employed to determine the maximum current value, and consequently the maximum torque, of the motor, it operates to open a circuit and thus to interrupt the notching operation of the main or automatic controller momentarily until the motor current again decreases sufficiently to allow the current limit device to reconnect the interrupted circuit causing further operation of the controller.

It is an object of my invention to provide means for limiting the acceleration of the driving motors of a railway vehicle to prevent slipping of the driving wheels upon the rails, and thus accomplish the same results as may be accomplished by the use of a current limit relay without employing the complicated mechanism necessarily associated therewith.

It is a further object of my invention to provide such means that is actuated by an inertia responsive mechanism in response to the rate of change of the speed of the vehicle.

Further objects of my invention will be apparent from the following description when taken in connection with the accompanying drawing illustrating one embodiment thereof wherein, Fig. 1 is a diagrammatic view showing apparatus and circuits illustrating one embodiment of the invention.

Fig. 2 is a sectional view taken on the line 2—2 of Fig. 1, and

Fig. 3 is a detail of the manually adjusting means for the inertia device.

Referring to the drawing, and more particularly to Fig. 1 thereof, two main driving motors 1 and 2 are provided for driving the vehicle, and are controlled in accordance with the operation of a notching controller 3, which controls the supply of power to the motors from the overhead supply conductor 4. The notching controller 3 is controlled by a master controller 5 operated by the motorman, which causes energization of the motor 6 to drive the notching controller 3 through the gear and clutch mechanism 7. An inertia device 9 is provided for slowing down or interrupting the effective operation of the motor 6 in a manner to be later described. A gear engaging mechanism 8 is provided to cause the worm 10 to engage the controller gear wheel 29 for operating it in a manner to be later described.

Upon operation of the master controller 5 to any of its operative positions, a circuit is completed from ground 12, through the battery 11, through conducting member 13 of the master controller, segment 14, winding 15 of the line contactor 16 and to ground, to connect the overhead conductor 4 to the controller 3. A circuit will also be completed from one of the contact members 17, 18 or 19 of the master controller 5 to a jumper 21, 22, or 23 respectively, on the controller 3. Electric conducting segments 24 and 25 are provided on the disc 26 of the controller, and are connected to be rotated upon operation of a gear wheel 29, by the shaft 27 to which both the gear wheel 29 and the disc 26 are fastened by the key 28. The jumpers 21, 22 and 23, which are stationary, are provided with brushes 31, 32 and 33, respectively, for engaging the conducting segment 24 and with brushes 34, 35 and 36, respectively, for engaging the conducting segment 25.

Upon connection of the conducting segments 24 and 25 to the battery 11 through the master controller 5, circuits are completed, respectively, to cause operation of the motor 6, and through conductor 37 and winding 38 of the gear engaging mechanism 8 for causing the worm 10 to be brought into operating engagement with the gear wheel 29. The gear engaging mechanism 8 comprises the winding 38, which actuates an armature 39 against the bias of a spring 41, forcing the armature in an upward direction, and correspondingly operating the rod 42 which carries the end of a shaft 43 upon which the worm 10 is mounted.

The shaft 43 is connected to a universal joint 44 and is driven by a shaft 45, which enters the casing 46 and connects to a bevel gear 47 that engages a similar bevel gear 48 driven by the motor 6. The gear 47 is loosely mounted upon the shaft 45, held in the bearing 49, and is provided with a clutching plate 56, formed integrally therewith, that is adapted to be engaged by a clutch plate 51 carried by the shaft 45. The clutch plate 51 is keyed to rotate with the shaft 45, but is axially movable along the shaft, and is maintained in frictional engagement against the plate 56 by means of a spring 54 that is biased between the plug 55 in the outer wall of the cap nut 50 and an armature member 52 which normally acts through the ball bearing 53 to force the plate 51 toward the left into engagement with the clutch plate 56. The cap nut 50 is formed of magnetic material and acts as an armature jointly with the member 52. A winding 57 is provided which, when energized, magnetizes the armature members 50 and 52, causing the movable member 52 to be actuated toward the right, thus releasing the pressure between the clutch plates 51 and 56 and permitting the shafts 45 and 43 to be stationary.

Upon operation of the master controller to cause engagement of the contact members 103 and 17, a circuit is completed through the brush 34, conducting segment 25, conductor 37 and coil 38, thus causing operation of the gear engaging mechanism 8 to effect engagement of the worm 10 with the gear 29. Simultaneously, upon completion of the above circuit, the motor 6 is energized by a circuit through conductor 113, the brush 31, segment 24, and conductor 114, and the controller 3, comprising the gear 29 and conducting segments 24 and 25, is operated in a clockwise direction until the brush 31 reaches the jog 60 in the segment 24 at which point it passes from the segment and interrupts the motor circuit. The segment 25 is also provided with a similar jog 59 which is, however, beyond the position of the jog 60 so that the device 8 is maintained energized, thus causing the worm 10 to maintain engagement with the gear 29 and hold the controller in its arrested position due to the friction between these two members.

If the motor circuit is completed through the brush 32, it will cause the controller 3 to operate in a clockwise direction until the brush 32 reaches the jog 58 in the segment 24 and passes from the segment at that point, thus interrupting the motor circuit and stopping the controller. The segment 25 is provided with a jog 61, slightly beyond the jog 58, so that the circuit through the brush 35 for energizing the coil 38 of the gear mechanism will be maintained after the motor 6 stops, thus holding the worm 10 in engagement with the gear 29 with sufficient frictional effect to prevent return of the controller to its original position. If the motor circuit is energized through the brush 33 the controller will operate through nearly a complete circle, or until the brush 32 reaches the end of the segment 24. The engaging mechanism 8 will remain energized throughout this entire operation and hold the controller in its arrested position. Upon deenergization of the winding 38 of the gear engaging mechanism 8 in any position, the spring 41 will operate to force the worm 10 from engagement with the gear 29, and the controller 3 will be actuated by a spring 70 and cable 62, about the drum 63, shown in Fig. 2, and returned to its initial or illustrated position.

A spring-pressed finger 20 is provided within the casing 46, mounted on a pin 30 and biased by a spring 40 into engagement with teeth provided on a disc 100 that is attached to the shaft 45 to prevent reverse movement of the shaft 45 upon disengagement of the clutch plates 56 and 51.

The controller 3 is provided with resistor elements 65 and 66 for controlling the speed of the main motors 1 and 2. Cooperating pairs of contact members 67 are provided along various points of the resistor 65 connecting them with a conductor 68 that leads to the motor. Similar pairs of cooperating contact members 72 are provided for shunting successive portions of the resistor 66 from the motor circuit through a conductor 73. The cooperating pairs of contact members 67 and 72 are controlled by a roller 69, carried by an arm 71, that is moved in accordance with the movement of the gear 29. A two position electromagnetic contactor 74 is provided, having a winding 75 and three contact members 76, 77 and 78, illustrated in their lower or deenergized position, for connecting the motors 1 and 2 in series circuit, or parallel circuit, relation.

A contactor 81 is provided for controlling the speed or motor 6, and comprises an electromagnet 82 and a contact member 83 which, in its deenergized or illustrated position, closes a circuit in shunt relation to the resistor 84 in the motor circuit. The contactor or relay 81 is controlled by the inertia responsive device 9 which comprises a pendulum 80 mounted within a casing 85, the pendulum swinging in accordance with the acceleration of the moving vehicle containing it. A pendulum restraining mechanism is provided in one side of the casing 85 and comprises a nipple 86, screw-threadedly attached within an opening in the casing and provided at its lower end portion with a recess forming an abutment. A sleeve 87 is slidably positioned within the nipple 86, and extends downwardly, being provided at its lower end with outwardly extending flanges 89, between which and the abutment in the nipple above mentioned a spring 88 is mounted surrounding the sleeve 87. The outwardly extending flange 89 on the sleeve 87, engages an inwardly extending flange 91 on an extension of the casing structure 85.

The sleeve 87 is formed having a larger internal diameter at its upper end than at its lower end, thus providing a shoulder midway of its length. It is screw-threaded at its upper end to receive a cap nut 90. A pressure member 92 is provided extending outwardly from the lower end of the sleeve 87, and having outwardly extending flanges 93 for engaging the shoulder midway of the sleeve 87. A screw plug 95 is provided for adjusting the bias of a spring member 94, and forces the pressure member 92 outwardly. In order to provide for readily adjusting the tension of the spring 94 a shaft 96 is provided that connects the plug 95 to an indicating lever and handle 97, located at any convenient place. The pendulum 80 is provided with a contact member 99, carried thereby, which is adapted to engage the contact members 101 and 102 upon different predetermined accelerations of the vehicle carrying the pendulum.

If the motorman moves the master controller 5 to its first operative position a circuit will be closed from the battery 11 through conducting portion 13, segment 14, and winding 15 of the line contactor 16, thus closing the contactor 16 and completing a circuit from the line conductor 4 through conductor 104, contactor 16, conductor 105, resistor 65, conductor 106, to the contact member 77 of the relay 74 in its lower position, through the field winding 107 and armature winding 108 of the motor 1, through the contact member 78 in its lower position and through windings 109 and 111 of the motor 2 to the ground connection 112, thus causing the motors 1 and 2 to start rotating at a slow rate of speed.

In this position of the master controller the contact member 103 engages the contact member 17 thus completing a circuit from the battery 11 through conductor 113, brush 31 on segment 24, through conductor 114, contact member 33 of the relay 81, and motor 6 causing the motor to operate. A circuit is also completed from the jumper 21, through the brush 34, segment 25, conductor 37, and coil 38 of the gear engaging mechanism 8, thus causing the worm 10 to be brought into engagement with the gear wheel 29 and operate the controller 3 by the motor 6 in a clockwise direction until the brush 31 reaches the jog 60 at which point the motor circuit will be interrupted, and the controller 3 brought to rest. While the controller 3 is being operated in a clockwise direction, the roller 69 advances and closes successive pairs of cooperating contact members 67 to cut out blocks of the resistor 65 from the motor circuit, thus increasing the speed of the motor.

If the motorman moves the handle of the master controller 5 to its second operating position, causing engagement of the contact members 103 and 18, the controller 3 will continue to operate in a clockwise direction until the brush 32 in the jumper 22 reaches the jog 58 in the segment 26 at which time it will interrupt the motor circuit. At this point in the operation of the controller 3, the gear 29 and the conducting segments 24 and 25, together with the roller 69, will have operated 180 degrees from their illustrated position, thus cutting out the entire resistor 65 from the motor circuit.

Should the motorman now advance the master controller 5 to its third operating position, causing engagement of the contact members 103 and 19, the motor 6 will be energized through the brush 33 and segment 24, and will operate throughout the remainder of its operative range, thus causing the roller 68 to advance to a position wherein it will cause successive engagement of the cooperating pairs of contact members 72, associated with the resistor 66. As the roller 68 engages the first or lower pair of cooperating contact members associated with the resistor 66, a circuit is closed through the resistor 66, conductors 115, 117, resistor 118 and winding 75 of the relay 74 to ground at 119, thus causing the relay 74 to operate the several contact members 76, 77 and 78 to their upper or energized position.

A circuit is now closed from the conductor 105 through the resistor 66, and by conductors 115 and 116, contact member 76 of the relay 74, field winding 109, and armature winding 111 of the motor 2 to ground at 112. A circuit to the motor 1 is completed from the conductor 115, through conductor 116, contact members 76 and 77 of the relay 74 in their upper positions, field winding 107, armature winding 108, and contact member 78 in its upper position, to ground at 121. In this position of the master controller, the motor 6 will continue to operate, closing successive pairs of cooperating contact members 72, to cut out an increasing number of blocks of the resistance 66 until the entire resistor is cut out of the motor circuit, thus bringing the motors to full speed.

The movable contact member 103 on the master controller 5 is so designed as to bridge the distance between two adjacent contact members of the group 17, 18 and 19, so that, as the master controller is advanced from one to another of its operative positions, the circuit controlling the next higher step in the operation of the notching controller 3 will be completed before the circuit controlling the previous step is interrupted. This maintains the circuit to the gear engaging mechanism 8 completed for all positions of the master controller except its "power off" or inactive position, and prevents return of the notching controller 3 to its initial position until return of the master controller to its inactive position.

If, at any position during the acceleration of the motor, the motorman moves the master controller 5 to its illustrated or inactive position, the gear mechanism 8 will be deenergized and the spring 41 will force the rod 42 downwardly bringing the worm 10 out of engagement with the gear wheel 29, thus releasing the frictional engagement therebetween and permitting the spring 70 to force the shaft 27 of the controller 3 to rotate in a counter-clockwise direction to its illustrated or initial position.

Upon placing the master controller 5 in any of its operative positions the motor 6 will advance the controller 3, closing successive pairs of cooperating contact members 67 or 72 at a definite rate of speed. Should this speed become greater than that corresponding to a predetermined acceleration of the vehicle for which the inertia device 9 has been set, a circuit will be closed extending from the conductor 114, through the conductor 122, the movable contact member 99 carried by the pendulum 80, through contact member 101, conductor 123, resistor 124, winding 82 of the relay 81 to ground at 125, thus causing the relay 81 to operate its contact member 83 to its upper position and introduce the resistor 84 in the circuit of the motor 6, thus slowing down the rate of operation of the motor. Should the vehicle reach a still greater acceleration the pendulum 80 will swing further to the left, and cause engagement of the contact member 99 with the contact member 102, thus completing a circuit from the conductor 114, through conductor 122, contact member 99, contact member 102, conductor 126, winding 57 and to ground at 127, thus energizing the magnetic core members 50 and 52 of the clutch mechanism 7, causing the member 52 to be actuated toward the right against the bias of the spring 54 and release the driving connection between the clutch plates 51 and 56, thus interrupting the operating connections between the motor driving gears 46 and 47, and the shaft 45, and permitting the worm 10 to remain inactive until the pendulum 80 swings to move the contact member 99 out of engagement with the contact member 102.

A pendulum restraining mechanism indicated generally at 130 is also provided on the front side of casing 85 for restraining the pendulum 80, and contact members 128 and 129 are provided in front of the movable contact member 99 carried by the pendulum, which contact members may be employed to control circuits effecting the rate of deceleration of the vehicle during braking operation, or may control circuits similar to those through contact members 101 and 102, and conductors 123 and 126, for controlling the acceleration of the vehicle when operated in the opposite direction.

The illustration and description of one embodiment of my invention is to be taken as illustrative only, and not in a limiting sense, since many changes in the circuits and apparatus disclosed will occur to those skilled in the art within the spirit of my invention and I do not wish to be limited otherwise than by the scope of the appended claims.

Having now described my invention, what I claim as new and desire to secure by Letters Patent, is:

1. In a motor control system for vehicles, in combination, an electric motor for driving the vehicle, a source of energy for said motor, means for connecting said motor to said source of energy, means for automatically controlling the power supplied to said motor during acceleration thereof, means responsive to a predetermined rate of acceleration of the vehicle for retarding the rate of operation of said controlling means, and means responsive to a higher rate of acceleration of the vehicle for interrupting said power controlling means.

2. A motor starting system for vehicles comprising an electric vehicle driving motor, a source of energy for said motor, means for connecting said motor to said source of energy, means for automatically controlling the power supplied to said motor during acceleration thereof, means responsive to a predetermined rate of acceleration of the vehicle for retarding the rate of operation of said controlling means, means responsive to a higher rate of acceleration of the vehicle for interrupting said power controlling means, and means for adjusting said predetermined rates of acceleration.

3. In a motor control system for vehicles, the combination with a driving motor, means for connecting said motor to a source of electric energy, automatic control means for progressively increasing the voltage applied thereto to control the acceleration thereof, of means including a free swinging pendulum for controlling the rate of acceleration thereof, and means responsive to a higher predetermined rate of acceleration for temporarily arresting the progressive operation of said automatic control means.

4. In a motor control system for vehicles, the combination with a driving motor, means for connecting said motor to a source of electric energy, automatic control means for progressively increasing the voltage applied thereto to control the acceleration thereof, of means including a free swinging pendulum for limiting the rate of operation of said automatic control means upon a predetermined acceleration of said vehicle and for interrupting the operation thereof upon a predetermined further acceleration of said vehicle.

5. A motor starting system for vehicles comprising an electric vehicle driving motor, a source of energy for said motor, means for connecting said motor to said source of energy, means operative upon connection of said motor to said source for progressively increasing the power supplied to said motor for acceleration thereof, means responsive to a predetermined rate of acceleration of said vehicle for decreasing the rate of increased power supply to said motor, and means responsive to a higher predetermined rate of acceleration of said vehicle for arresting the increase of power supply to said motor.

6. In combination, a vehicle, an electric motor for driving the vehicle, a source of electric energy therefor, means for connecting said motor to said source of energy, electroresponsive means operative upon connection of said motor to said source of energy for gradually increasing the power supplied to said motor, means responsive to a predetermined rate of acceleration of said vehicle for decreasing the rate of operation of said electroresponsive means, and means responsive to a higher predetermined rate of acceleration of said vehicle for interrupting the operative effect of said electroresponsive means.

7. In combination, a vehicle, an electric motor for driving said vehicle, a source of electric energy therefor, means for connecting said motor to said source of energy, an acceleration controller, an electroresponsive means, a clutch mechanism for operatively connecting said acceleration controller to said electroresponsive means for actuating said acceleration controller upon connection of said motor to said source of energy to gradually increase the power supplied to said motor, means responsive to a predetermined rate of acceleration of the vehicle for decreasing the rate of operation of said electroresponsive means, and means responsive to a higher rate of acceleration of the vehicle for operating said clutch mechanism to interrupt the operation of said acceleration controller.

8. A motor starting system for vehicles comprising an electric vehicle driving motor, a source of energy for said motor, means for connecting said motor to said source of energy, means for automatically controlling the power supplied to said motor during acceleration thereof, electroresponsive means for decreasing the rate of operation of said automatically controlled means, electroresponsive means for interrupting the operation of said automatic control means, and means responsive to the rate of acceleration of the vehicle for effecting the energization of said electroresponsive means at different predetermined rates of acceleration of the vehicle.

9. A motor starting system for vehicles comprising an electric vehicle driving motor, a source of energy for said motor, means for connecting said motor to said source of energy, means for automatically controlling the power supplied to said motor during acceleration thereof, electroresponsive means for decreasing the rate of operation of said automatic control means, electroresponsive means for interrupting the operation of said automatic control means, an inertia device responsive to the rate of acceleration of the vehicle for effecting the energization of said electroresponsive means at different predetermined rates of acceleration of the vehicle, biasing means for opposing the operation of said inertia device, and means adjustable manually for changing the setting of said biasing means.

10. In a motor control system for vehicles, the combination with a driving motor, means for connecting said motor to a source of electric energy, automatically controlled electroresponsive means operative upon connection of said motor to said source of energy for progressively increasing the power supplied to said motor, and means including a free swinging pendulum for limiting the rate of operation of said automatic control means upon a predetermined acceleration of said vehicle and for interrupting the operation thereof upon a predetermined further acceleration of said vehicle.

11. In a vehicle control apparatus, in combination, a driving motor, means for controlling acceleration of the driving motor, an electroresponsive device responsive to variations in the supply of current thereto for controlling said means, resistance means, a relay operable to control the inclusion and exclusion of said resistance means in circuit with said electroresponsive device to control the current supplied thereto, contacts for controlling the energization of said relay, and an inertia operated device for operating said contacts.

12. In a vehicle motor control system, in combination, a rotary element for driving an accelerator to control acceleration of the vehicle, a device having two relatively stationary contacts and a movable contact adapted to engage a first of said stationary contacts at one rate of acceleration of the vehicle and to engage the other or second of said stationary contacts at a higher rate of acceleration of the vehicle, a first electroresponsive means operated upon engagement of said movable contact with said first stationary contact for varying the speed of rotation of said rotary element, and a second and independent electroresponsive means operated upon engagement of said movable contact with said second stationary contact for again varying the speed of rotation of said rotary element.

ELLIS E. HEWITT.